(12) United States Patent
Aoki et al.

(10) Patent No.: US 6,342,683 B1
(45) Date of Patent: Jan. 29, 2002

(54) WEIGHT SENSOR FOR VEHICLE OCCUPANT

(75) Inventors: Hiroshi Aoki; Shuji Kusaka, both of Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/573,841

(22) Filed: May 19, 2000

Related U.S. Application Data (60) Provisional application No. 60/135,141, filed on May 20, 1999.

(51) Int. Cl.$^7$ .......................... G01G 19/52; B60K 28/00
(52) U.S. Cl. ...................... 177/144; 180/273; 280/735; 340/667
(58) Field of Search .................... 177/136, 144, 177/210 R; 180/273; 280/735; 701/45; 340/667

(56) References Cited

U.S. PATENT DOCUMENTS

| | | | | |
|---|---|---|---|---|
| 5,714,695 A | * | 2/1998 | Burns | 180/273 |
| 5,739,757 A | * | 4/1998 | Gioutsos | 340/667 |
| 5,864,295 A | * | 1/1999 | Jarocha | 340/667 |
| 6,039,344 A | * | 3/2000 | Mchney et al. | 280/735 |
| 6,069,325 A | * | 5/2000 | Aoki | 177/136 |
| 6,092,838 A | * | 7/2000 | Walker | 280/735 |
| 6,104,100 A | * | 8/2000 | Neuman | 701/45 |
| 6,161,891 A | * | 12/2000 | Blakesley | 280/735 |

FOREIGN PATENT DOCUMENTS

| | | |
|---|---|---|
| JP | 11-304579 | 11/1999 |
| JP | 11-351952 | 12/1999 |

* cited by examiner

*Primary Examiner*—Randy W. Gibson
(74) *Attorney, Agent, or Firm*—Foley & Lardner (57) ABSTRACT

A seat weight measuring apparatus and supporting structure that can be installed in a vehicle without changing the height of the existing seat frame. This is done by shifting the centerline of the sensor unit from the centerline of the seat frame to take advantage of a space for the insertion of the sensor on the side of the frame. Accordingly, the seat height does not need to be raised by the thickness of the sensor unit as required in the conventional seat weight measuring apparatus. Depending on where space is available underneath the seat, the sensor units may also be positioned perpendicular to the seat rail, in an "X" shape, a "Y" shape, or a "T" shape.

16 Claims, 10 Drawing Sheets

WEIGHT SENSOR FOR VEHICLE OCCUPANT

WEIGHT SENSOR FOR VEHICLE OCCUPANT

This application incorporates by reference U.S. provisional application Ser. No. 60/135,141 filed May 20, 1999.

1. Field of the Invention

The invention relates to a weight sensor for measuring the weight of an occupant of a vehicle.

2. Background of the Invention

In recent years, there has been a trend toward controlling the operation of vehicle safety belts and air bags according to the weight of a passenger using a seat weight measuring device in order to improve the performance of such safety devices.

An occupant weight sensor is required to have both detecting accuracy and strength. To detect load, a strain gauge is normally used as a load sensor. From a view point of the detecting accuracy, a variation in the gravitational direction of a weight about 100 g should be detected so that the load sensor is required to deflect by the weight about 100 g. As for load not in the gravitational direction, the accuracy should not be affected even by application of a force of 100 kg. As for the strength, the load sensor should not be deformed even by application of a load more than 300 kg, preferably 1000 kg, and should not be broken even by application of a load of 1000 kg, preferably 2300 kg. Examples of the load sensor satisfying the aforementioned requirements include a load sensor that is manufactured significantly precisely and load sensors disclosed in Japanese Patent Application No. H10-121627 (H8044, KP1080) (U.S. application Ser. No. 09/288,631) and Japanese Patent Application No. H10-172098 (KP1079) (U.S. application Ser. No. 09/326,662).

A vehicle seat normally comprises seat rails, side frames, a seat pan, and a reclining mechanism. Since the occupant's load is transmitted to a vehicle body through the side frames and the seat rails, the side frames and the seat rails are finally subjected to the weight of the occupant. Accordingly, to measure the entire weight of the vehicle seat, sensors are inserted to be positioned on upper surfaces or lower surfaces of the seat rails or portions of the side frames. Since the load sensors should be incorporated at effective positions for accuracy and strength, the load sensors are positioned on the central axis of force transmitted from the side frame to a vehicle body via seat rails. However, when the load sensors are so disposed, the height of the seat frame is risen by the existence of the load sensors, thus raising the squab height. This causes problems particularly in case of installation into vehicles with restrictions on the installation of seats and/or the hip point (i.e., the pivot center of the torso and thigh).

Figure 2A:
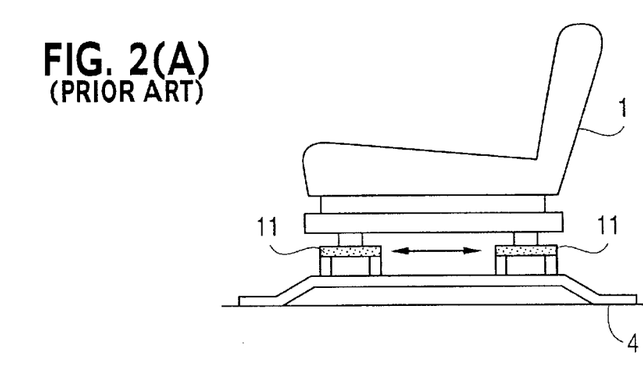
FIG. 2(A) shows a conventional configuration of arranging a load or weight sensor.
Figure 2B:
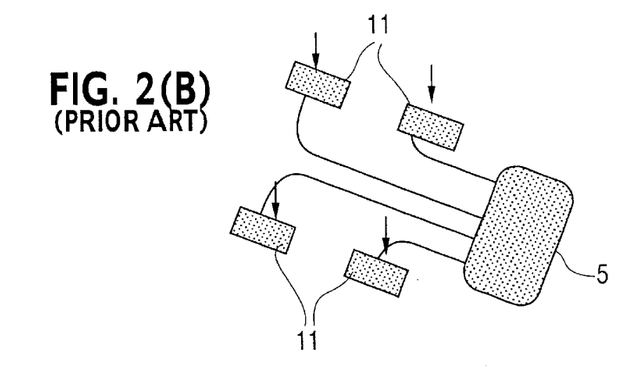
FIG. 2(B) shows a top view of the sensor arrangement.

The sensor arrangement shown in FIG. 2 is a first conventional arrangement that comprises sensors 11 directly disposed at four locations to measure load applied to a vehicle seat 1. Measurements made by sensors 11 are transmitted to the seat weight sensor electronic control unit 5.

Figure 1A:
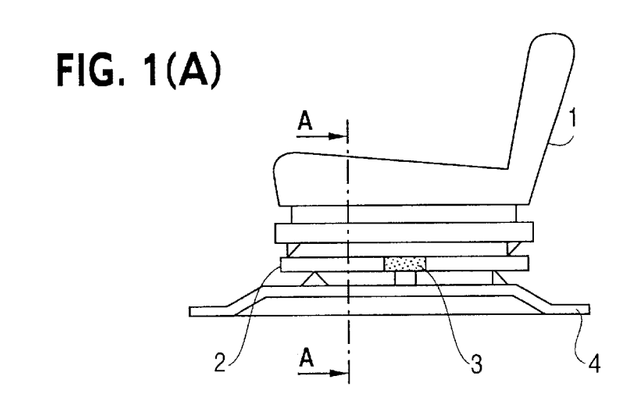
FIG. 1(A) shows a side view of a seat mounted to a vehicle body and incorporating a seat weight measuring device according to any of the second or third conventional arrangements or the first through third embodiments of the present invention.
Figure 1B:
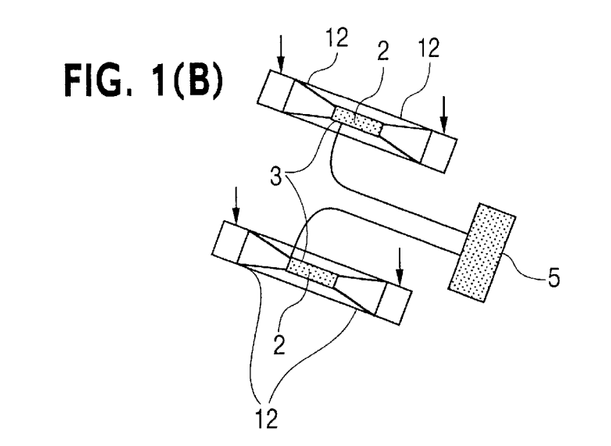
FIG. 1(B) shows a top view of the sensor arrangement.
Figure 3:
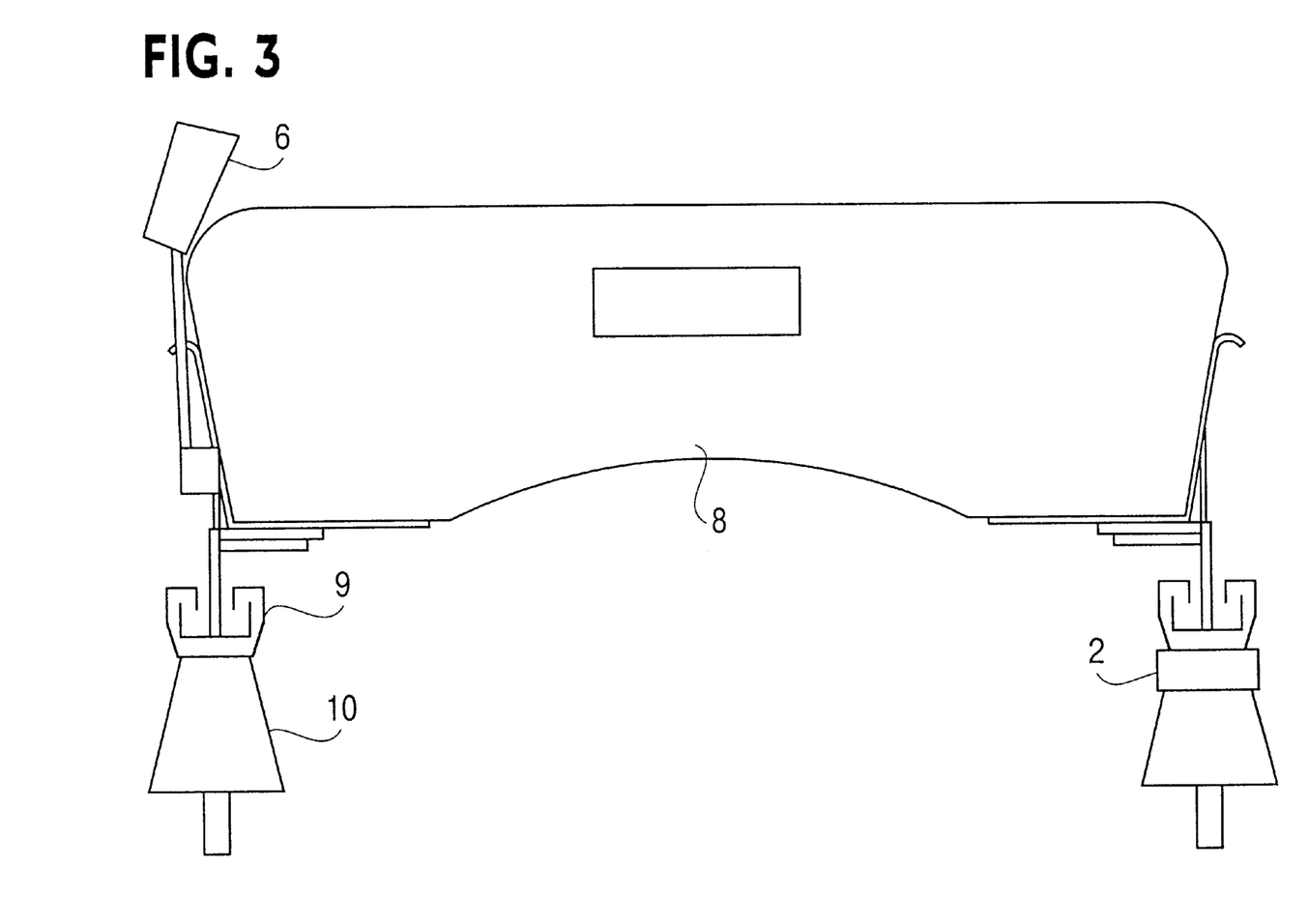
FIG. 3 is a sectional view of the apparatus shown in FIG. 1, taken along the line A—A, as it applies to the second conventional arrangement shown in FIG. 9.
Figure 9:
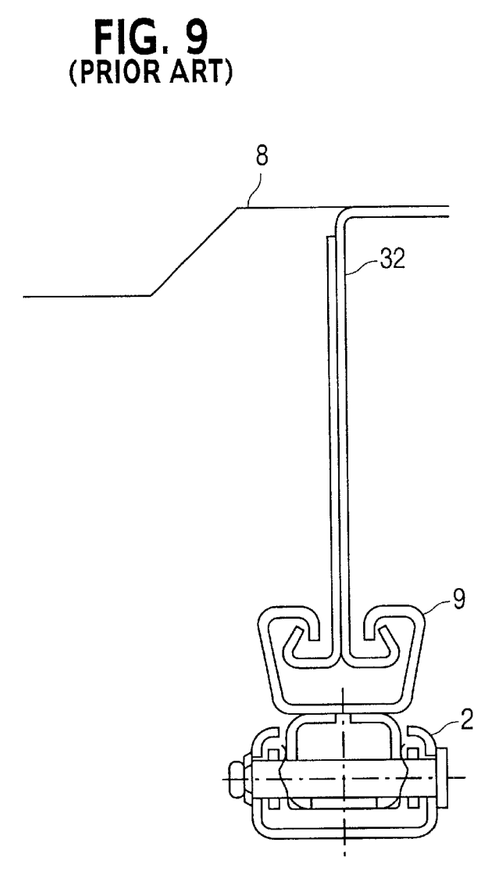
FIG. 9 shows a front partial view of a second conventional arrangement of a load or weight sensor.

FIGS. 1, 3, and 9 show a second conventional arrangement of the load sensor units 2. The sensor units 2 are composed of the load sensors 3 and the load transmitting mechanisms 12 and are mounted between the seat rail 9 and seat bracket 10. Seat rail 9 is connected to seat frame 32, which is in turn attached to seat pan 8 of seat 1. Buckle 6 is attached to seat 1. Because mounting the load sensor units 2 requires raising the height of the seat rail 9 by the thickness of sensor unit 2, the overall height of the seat is also raised especially in case of a seat of which the bracket height is low.

Figure 8:
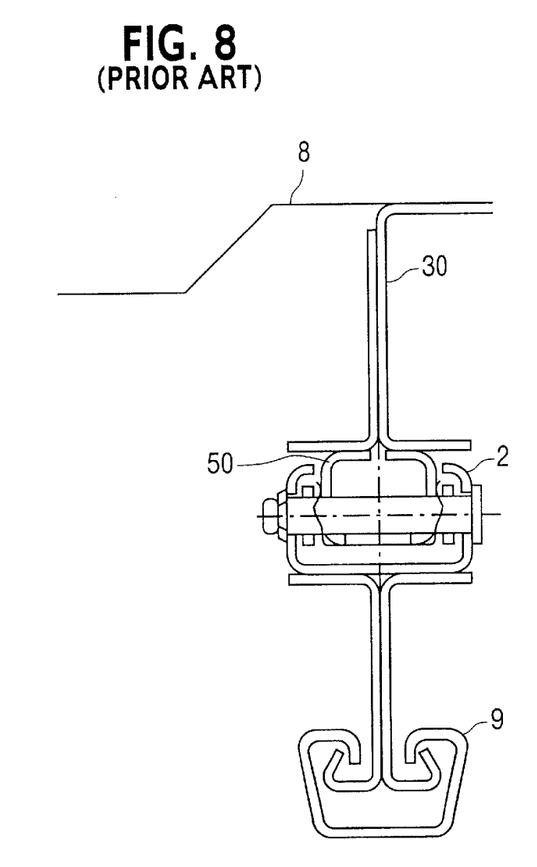
FIG. 8 shows a front partial view of a third conventional arrangement of a load or weight sensor.

FIG. 8 shows a third conventional arrangement of the load sensor units 2, which is similar to the first conventional arrangement except that the load sensor units are positioned above the seat rails 9. Load sensor units 2 are mounted between lower seat brackets 31 and upper seat brackets 30. The weight (load) applied on a brackrest and a seat squab is transmitted through a seat pan, the upper seat frame, the load or weight sensor, the lower seat frame and a floor rail to a vehicle floor. Reference 50 illustrates the load bearing portion of sensor unit 2. Like in the first conventional arrangement, this arrangement raises the hip point.

The hip point is an essential condition for the layout of a vehicle cabin, so when the hip point is changed, modification in the layout of the vehicle is required. For this, a technique allowing load sensors to be incorporated to a vehicle seat without changing the hip point would bring great technical gains.

It is therefore an object of the present invention to provide an occupant weight sensor, which comprises load sensors incorporated to a vehicle seat, and supporting structure that are mounted to a vehicle for measuring the weight of an occupant acting on a vehicle seat without changing the squab height (hip point) of the vehicle seat.

SUMMARY OF THE INVENTION

The present invention provides a seat weight measuring apparatus and supporting structure that can be installed in a vehicle without changing the height of the existing seat frame. This is done by shifting the center line of the sensor unit 2 from the center line of the seat frame 34/40/44 to take advantage of a space for the insertion of the sensor on the side of the frame. Accordingly, the seat height does not need to be raised by the thickness of the sensor unit 2 as required in the conventional seat weight measuring apparatus. Depending on where space is available underneath the seat, the sensor units may also be positioned perpendicular to the seat rail, in a "Y" shape, or in a "T" shape.

DETAILED DESCRIPTION OF THE PREFERRED EMBODIMENTS

The sensor arrangement shown in FIG. 1, which corresponds to any of the second or third conventional arrangements or the first through third embodiments of the present invention, is an example in which loads at four locations are combined into two by load transmitting mechanisms 12 and are measured by two sensors 3. The load transmitting mechanism comprises levers and shafts, wherein load applied from the vehicle seat is received by one end of the lever and is transmitted to the sensor on the other end of the lever via the pivot shaft. The sensor unit is composed of one load sensor module and the load transmitting mechanisms at two locations that are arranged in one rail.

Figure 10:
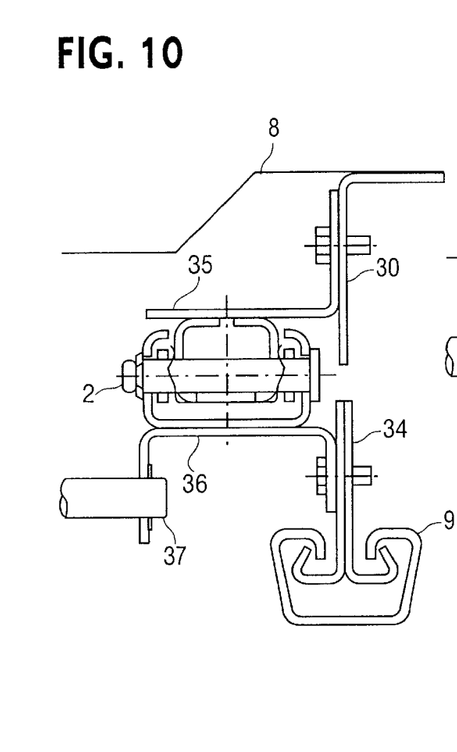
FIG. 10 shows a front partial view of a first embodiment of the present invention.
Figure 11:
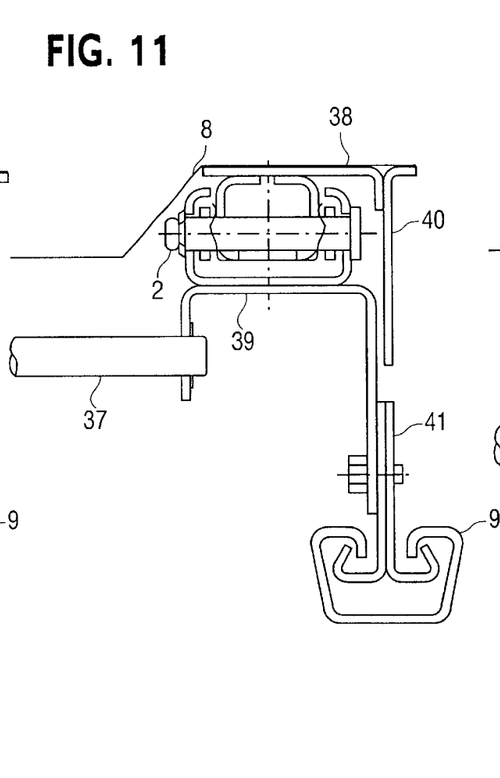
FIG. 11 shows a front partial view of a second embodiment of the present invention.
Figure 12:
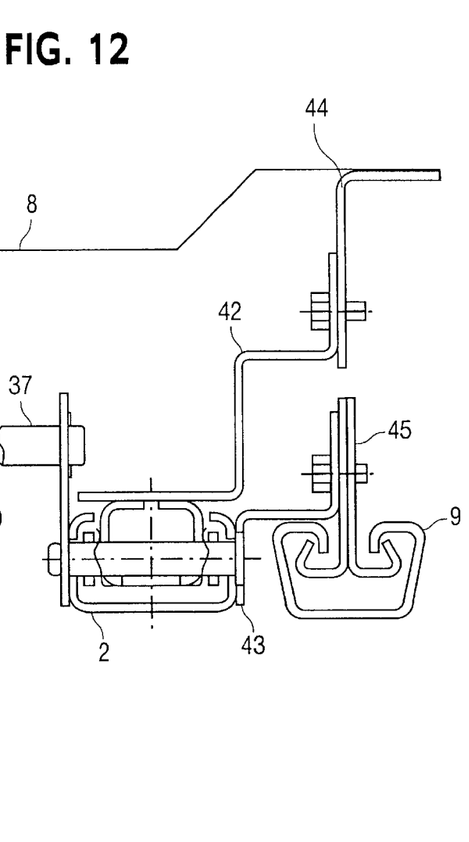
FIG. 12 shows a front partial view of a third embodiment of the present invention.

FIGS. 10–12 show the first through third embodiments, respectively, in which the sensor units 2 are incorporated into the seat 1 without changing the height of the existing seat frame. This is done by shifting the center line of the sensor unit 2 from the center line of the seat frame 34/40/44 to take advantage of a space for the insertion of the sensor on the side of the frame. The sensor units 2 are mounted between the vehicle seat 1 and seat rail 9 in such a manner as to be arranged in parallel to the seat rails 9, thereby preventing the interference with a preset space when the sensor units 2 are installed into the vehicle seat 1 and the vehicle 4. These methods allow the weight sensors to be installed to a seat of even a sport type vehicle with low seat frames and low hip point without making modifications to the vehicle 4 or seat 1.

FIG. 10 illustrates the first embodiment, in which the sensor unit 2 is positioned approximately mid way between the seat pan 8 and the seat rail 9. The weight (load) applied on a backrest and a seat squab is transmitted to the load or weight sensor through a seat pan, an upper seat frame, and the upper bracket. Then the weight (load) is transmitted to a vehicle floor through the lower bracket, a lower seat frame, and a floor rail. Sensor unit 2 is mounted on its upper side to upper bracket 35. Upper bracket 35 is mounted to upper seat frame 33, which is, in turn, mounted to seat pan 8. Sensor unit 2 is mounted on its lower side to lower bracket 36. Lower bracket 36 is attached to lower seat frame 34, which is, in turn, connected to seat rail 9. The upper bracket 35 and lower bracket 36 could be formed integrally with the upper seat frame 33 and lower seat frame 34, respectively.

FIG. 11 illustrates the second embodiment, in which the sensor unit 2 is positioned at the top of the space between the seat pan 8 and the seat rail 9. The sensor is inserted into a space existing under a side of the seat pan, and the sensor can bear the load on the seat squab through the seat pan and the load on the backrest through the upper seat frame. The weight (load) applied on a backrest and a seat squab is transmitted to the load or weight sensor through a seat pan and an upper bracket. Then the weight (load) is transmitted to a vehicle floor through the lower bracket, and lower seat frame, and a floor rail. Sensor unit 2 is mounted on its upper side to upper bracket 38. Upper bracket 38 is mounted to upper seat frame 40, which is, in turn, mounted to seat pan 8. Sensor unit 2 is mounted on its lower side to lower bracket 39. Lower bracket 39 is attached to lower seat frame 41, which is, in turn, connected to seat rail 9. The upper bracket 38 and lower bracket 39 could be formed integrally with the seat pan 8 and lower seat frame 41, respectively.

FIG. 12 illustrates the third embodiment, in which the sensor unit 2 is positioned at approximately the same height as seat rail 9. The weight (load) applied on a backrest and a seat squab is transmitted to the load or weight sensor through a seat pan, an upper seat frame, and the upper bracket. Then the weight (load) is transmitted to a vehicle floor through the lower bracket, a lower seat frame, and a floor rail. Sensor unit 2 is mounted on its upper side to upper bracket 42. Upper bracket 42 is mounted to upper seat frame 44, which is, in turn, mounted to seat pan 8. Sensor unit 2 is mounted on its lower side to lower bracket 43. Lower bracket 43 is attached to lower seat frame 45, which is, in turn, connected to seat rail 9. The upper bracket 42 and lower bracket 43 could be formed integrally with the upper seat frame 44 and lower seat frame 45, respectively.

Because the center axis of the sensor 2 is shifted from the center axis of the frame 33/40/44 in each of the first through third embodiments, the seat frame may be laterally deformed when a large vertical load is applied if any one of upper brackets 35,38,42 or lower brackets 36,39,43 is weak. To avoid such deformation, a reinforcing member 37 may be disposed laterally between the sensor units 2 on either side of the seat 1 to connect the right and left seat frames to each other. The reinforcing member 37 is not subjected to the load from an occupant. The reinforcing member 37 is for reinforcing the structure of the vehicle seat. The reinforcing member prevents the torsion or the lateral inclination due to this offset configuration. The reinforcing member may be a rod or a plate. Further it may be fixed directly to a weight (load) sensor. In this way, the seat with the load sensors can be structured to have enough strength without changing the hip point. The reinforcing member 37 may be a rod or a plate and may be fixed directly to the sensor units 2.

Force applied to the load sensor includes simple vertical load and other moment loads produced by the shift of the center axis. Since the load sensor measures only vertical load, the other moment loads do not affect the accuracy of the load sensor. From this point of view, a sensor unit 2 of such a type transmitting load to load sensors 3 via load transmitting mechanisms 12 has an advantage because adverse effects of moment loads can be easily cancelled by the structure of the transmitting mechanisms 12.

Figure 4A:
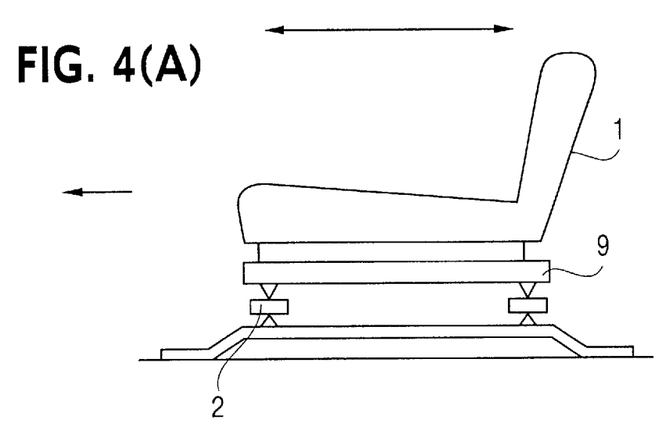
FIG. 4(A) shows a side view of a fourth embodiment of the present invention.
Figure 4B:
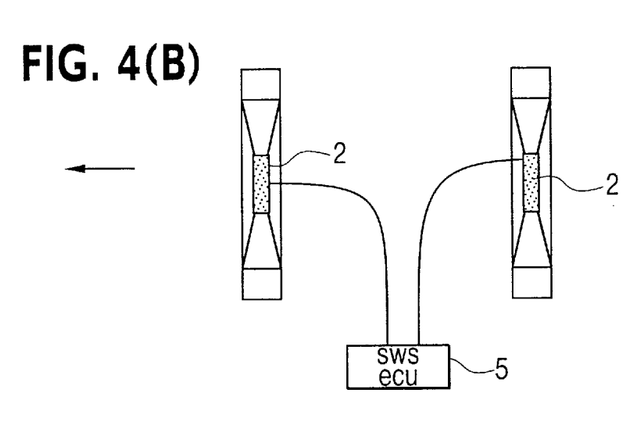
FIG. 4(B) shows a top view of the sensor arrangement.
Figure 13:
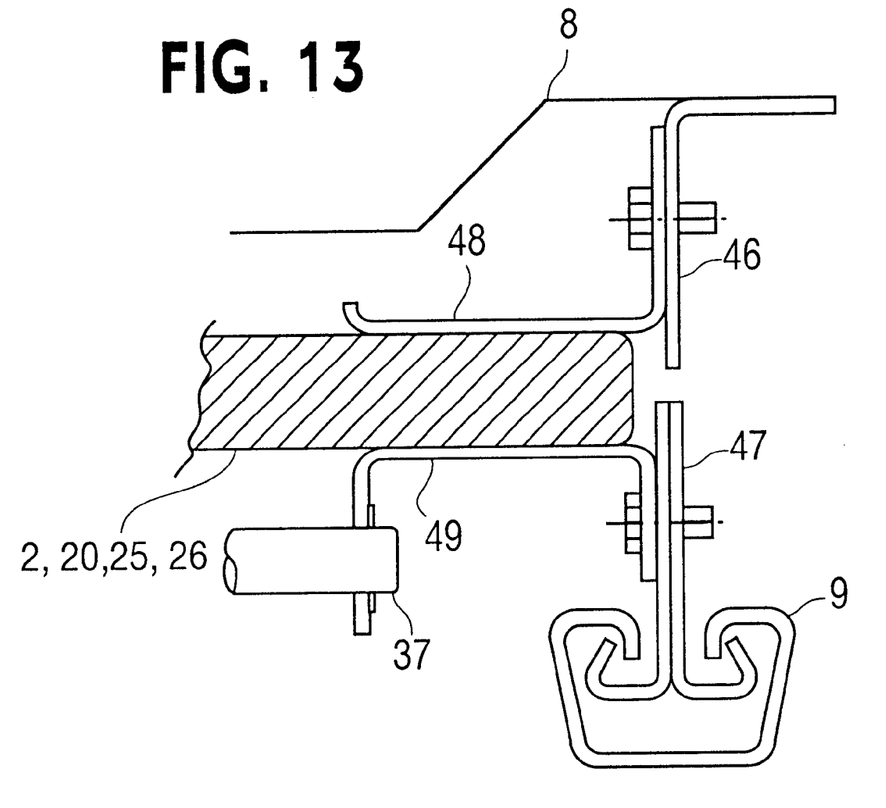
FIG. 13 shows a front partial view of the fourth embodiment of the present invention.

FIGS. 4 and 13 illustrate a fourth embodiment of the present invention, which is similar to the first through third embodiments, except that sensor units 2 are arranged perpendicular to the seat rails 9. Since a curved portion (convex portion) of seat pan 8 right beneath the hip point is sandwiched between front and rear portions of the vehicle seat 1, spaces exist in the front and rear portions of the vehicle seat for connecting the right and left seat rails 9 by the frames. The sensor units 2 are inserted into the spaces so as to prevent interference with the existing seat mechanism.

In FIG. 4, the two-sided arrow illustrates the forward and backward direction of travel of the seat 1 on the seat rails 9. The one-sided arrow illustrates the forward direction of the vehicle, as it also does in FIGS. 5–7.

The top portion of sensor unit 2 is connected to upper bracket 48. Upper bracket 48 is attached to upper seat frame 46, which is, in turn, attached to seat pan 8. The bottom portion of sensor unit 2 is connected to lower bracket 49. Lower bracket 49 is connected to lower seat frame 47, which is, in turn, connected to seat rail 9. Reinforcement member 37 is connected between the lower brackets on either side of the seat to provide additional support against the bending moment caused by the placement of sensor unit 2 offset from the vertical axis of seat rail 9. The upper bracket 48 and lower bracket 49 could be formed integrally with the upper seat frame 46 and lower seat frame 47, respectively.

It should be noted that if the sensor unit 2 is strong enough, reinforcing member 37 is not required.

Figure 5A:
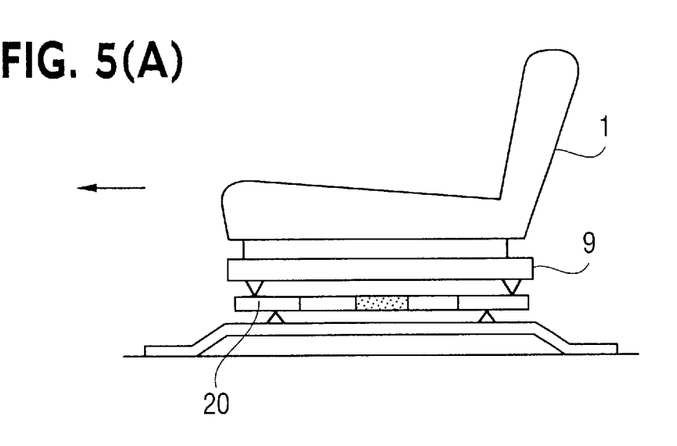
FIG. 5(A) shows a side view of a fifth embodiment of the present invention.
Figure 5B:
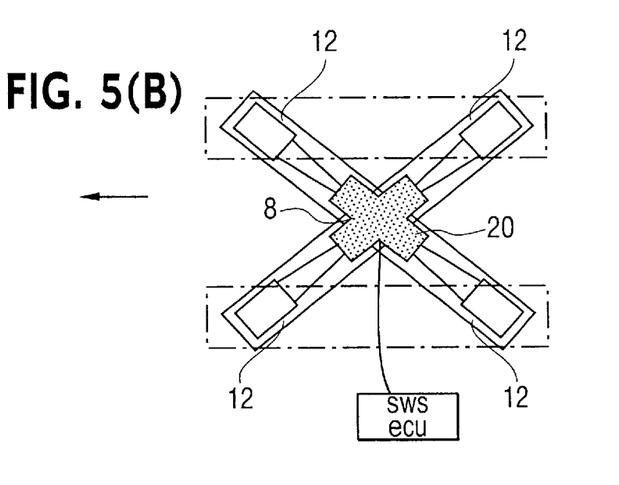
FIG. 5(B) shows a top view of the sensor arrangement.

FIG. 5 illustrates a fifth embodiment of the present invention, which is similar to the fourth embodiment, except that the transmitting mechanisms 12 of sensor unit 20 are arranged in an "X" shape. Loads are received at four locations by the transmitting mechanisms 12, front and rear on left and right sides of the lower portion of the vehicle seat, and are transmitted to load sensors 3 at one location. Because the load sensors are positioned at one location, the electrical circuit and wiring for detecting load can be simply constructed. The sensor unit 20 is mounted to the seat 1 as shown in FIG. 13 in the same manner as in the fourth embodiment.

Figure 6A:
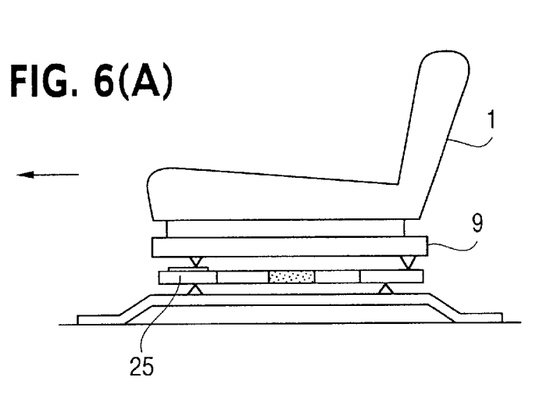
FIG. 6(A) shows a side view of a sixth embodiment of the present invention.
Figure 6B:
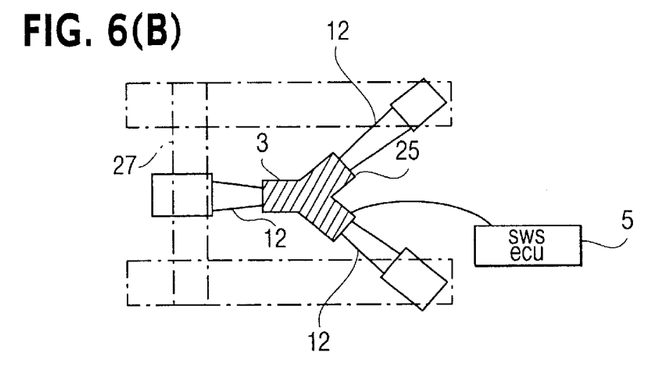
FIG. 6(B) shows a top view of the sensor arrangement.

FIG. 6 illustrates a sixth embodiment of the present invention, which is similar to the fifth embodiment, except that only a single transmitting mechanism 12 is used to measure loads at both the front-left and front-right seat portions. Cross brace 27 is connected between the front of the left and right seat rails 9 such that the combined load is transmitted through cross brace 27 to the front transmitting mechanism 12, which, in turn, transmits the combined load to the load sensor 3. The back two transmitting mechanisms are attached to the seat 1 and seat rail 9 in the same manner as shown in FIG. 13. The three transmitting mechanisms form a "Y" shape. This arrangement has more simple transmitting mechanisms than do those of the fifth embodiment.

Figure 7A:
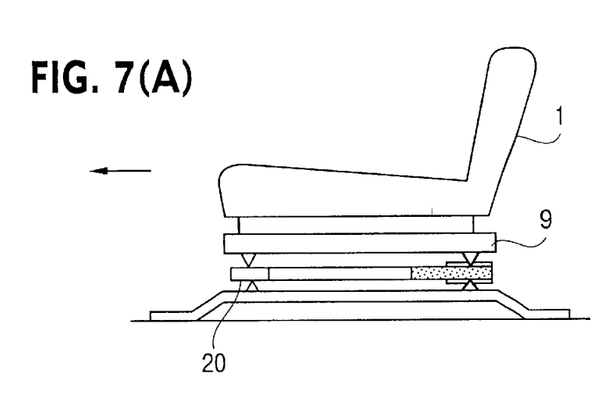
FIG. 7(A) shows a side view of a seventh embodiment of the present invention.
Figure 7B:
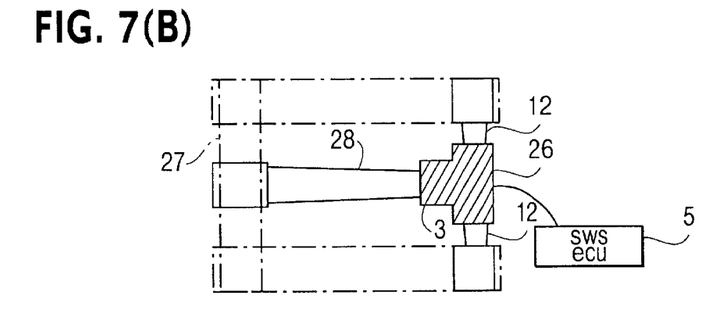
FIG. 7(B) shows a top view of the sensor arrangement.

FIG. 7 illustrates a seventh embodiment of the present invention, which is similar to the sixth embodiment, except that the load sensor 3 is positioned between the back-left and backright portions of seat 1 such that the transmitting mechanisms 12, 28 form a "T" shape. Transmitting mechanism 28 is similar to transmitting mechanism 12, except that it is longer. Since a space exists in this portion according to the structure of the vehicle seat, the sensor can be incorporated to the vehicle seat without changing the hip point. Alternatively, the portion for mounting the sensor may be shifted forward.

In the sixth and seventh embodiments, when loads on three load sensors 3 corresponding to the three transmitting mechanisms are summed, the load transmitting ratio between the front load and the rear loads on two locations may be set to 2:1 for mechanically summing. When the sensor can detect separately respective loads from the load transmitting mechanisms 12,28, the electrical calculation is possible. In this case, the transmitting ratio can be freely set.

Figure 14A:
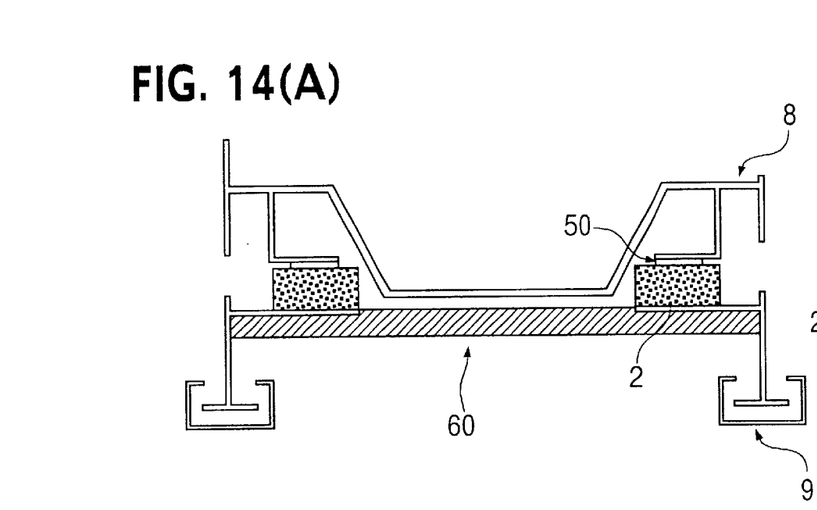
FIG. 14(A) shows a front view of an eighth embodiment of the present invention.
Figure 14B:
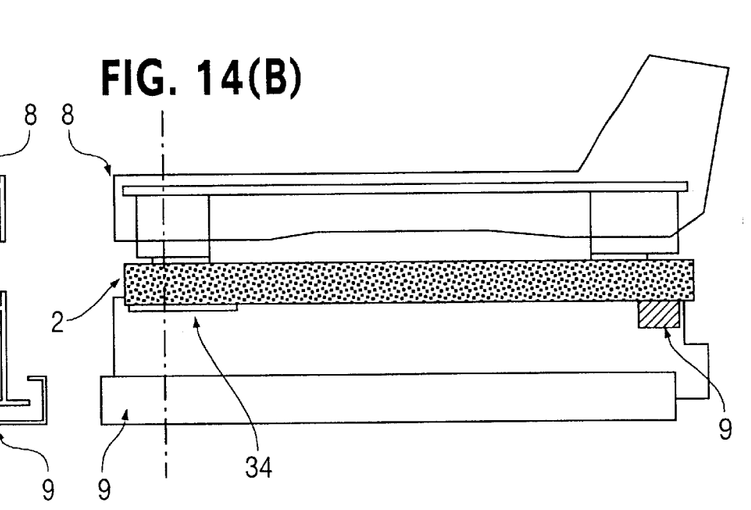
FIG. 14(B) shows a side view of the eighth embodiment.

FIG. 14 illustrates an eighth embodiment of the present invention, which is similar to the first through third embodiments, except that sub frame 60 replaces the reinforcement member 37. According to this embodiment, moment developed between the sensor and the frame due to the inward offset arrangement of the sensor can be reduced by supporting the load sensors by the sub frame, thereby improving measurement accuracy and ensuring the rigidity of the seat.

In this embodiment, a seat front portion is not reinforced by a sub frame and a seat rear portion is reinforced by the sub frame. But a sub frame may be arranged in both the seat front and rear portion or only in the seat front portion. According to the structure of the vehicle seat, there is a case in which the sensor units 2 must be largely offset when the sensor units are mounted to the seat frame. In case of the example in which the load sensor is held by a mounting bracket, a large moment force is applied to the mounting bracket so that the seat frame and the sensor are deformed. In the fifth through seventh embodiments, the reinforcing member 37 is used against the deformation of the seat, but the reinforcing member itself is not subjected to the load on the seat. In the eighth embodiment, sub frame 60 is disposed to bridge the seat rails 9 and sensor units 2 are arranged on the sub frames 60. In this case, load on the seat is received by the sub frames, thereby allowing the sensors to be arranged largely offset from the center axis. As shown in FIG. 14, a single sub-frame is used to support the back side of the seat and the back ends of the sensor units while brackets like those shown in FIGS. 10–12 are used to support the front ends of the sensor units 2. Alternatively, a second sub frame 60 could be used on the front side of the seat, instead of the brackets. Moment developed between the load sensor unit 2 and the frame due to the inward offset arrangement of the sensor units 2 can be reduced by supporting the load sensor units 2 by the sub frame 60, thereby improving measurement accuracy and ensuring the rigidity of the seat 1.

Figure 15A:
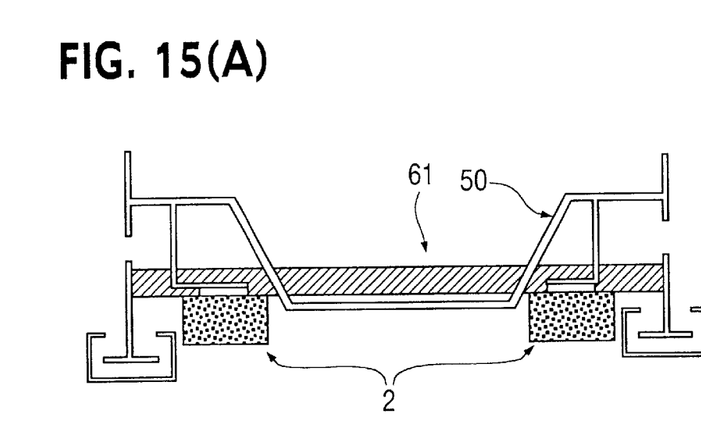
FIG. 15(A) shows a front view of a ninth embodiment of the present invention.
Figure 15B:
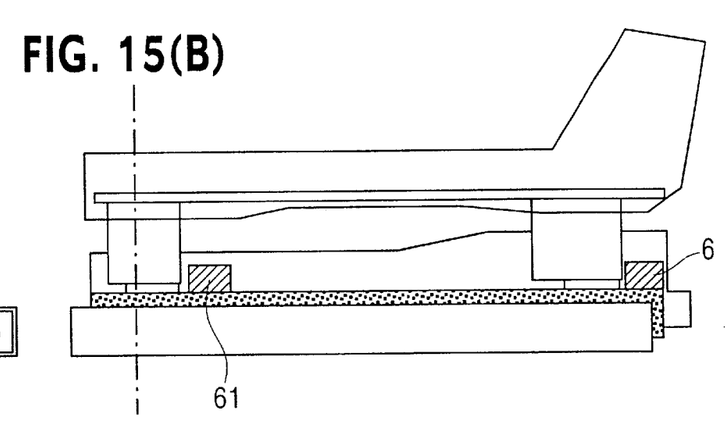
FIG. 15(B) shows a side view of the ninth embodiment.

FIG. 15 illustrates a ninth embodiment, which is similar to the first through third and eighth embodiments except that sensor units 2 (or assemblies composed of separate load sensors incorporated in separate frames) are arranged beneath sub frames 61. Since the sensor units 2 are mounted to lower portions, the sensor units can be installed to a seat even with large interference with a seat pan.

Figure 16A:
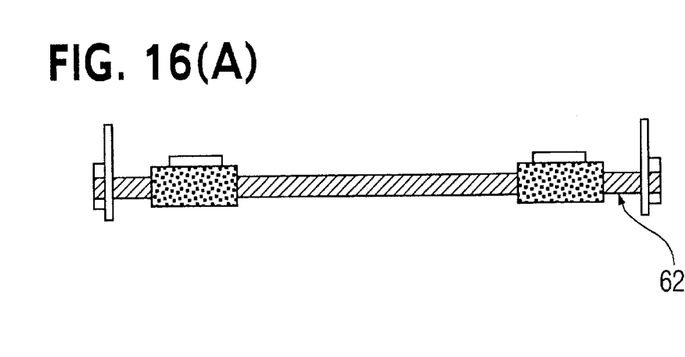
FIG. 16(A) shows partial front view of a tenth embodiment of the present invention.
Figure 16B:
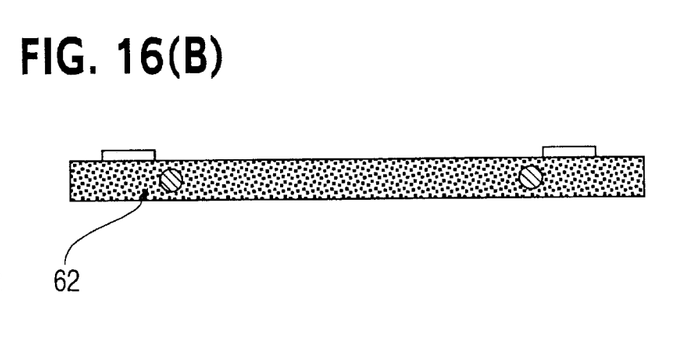
FIG. 16(B) shows a side view of the tenth embodiment.

FIG. 16 illustrates a tenth embodiment, which is similar to the first through third, eighth, and ninth embodiments except that round bars or pipes 62 are used as the sub frames. Pipes 62 penetrate portions corresponding to pivot supports or connecting shafts of the load transmitting mechanisms 12 whereby the reinforcing members 62 of the vehicle seat function also as parts of the load transmitting mechanisms 12, thereby reducing the number of parts and the space for the sensor mechanisms and thus making the sensor units 2 compact.

Figure 17:
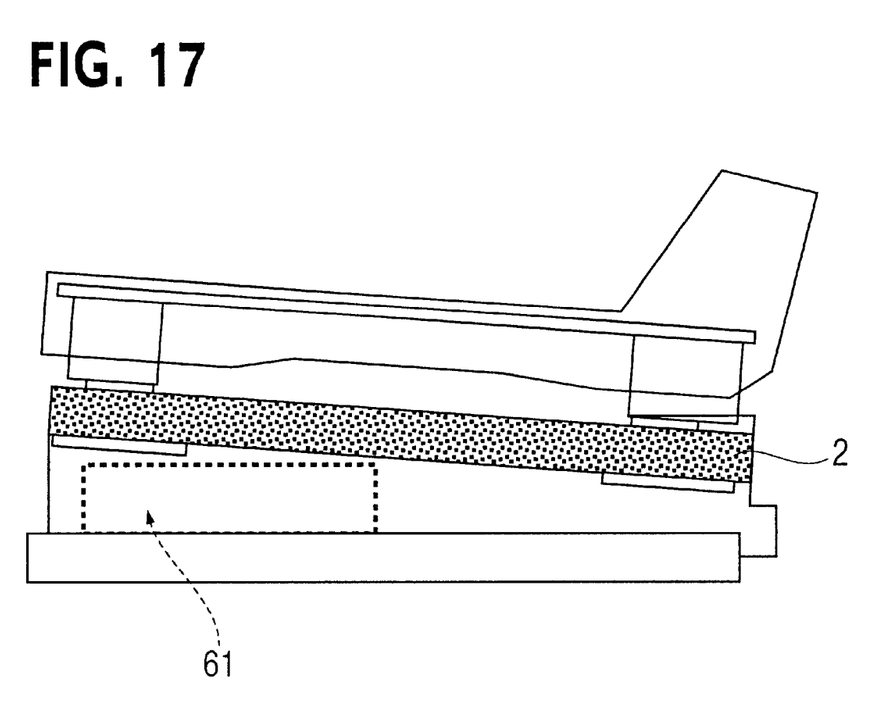
FIG. 17 shows an eleventh embodiment of the present invention.

FIG. 17 illustrates an eleventh embodiment, in which the load sensors 2 must be positioned to avoid interference with locking mechanisms 61 of seat rails 9. Instead of employing an offset arrangement like in the other embodiments, load sensors are disposed such that the detecting axes thereof are inclined relative to the gravitational direction so as to avoid interference with a basic mechanism composing a vehicle seat. This arrangement can simplify the reinforcing members without affecting the accuracy of the sensors. Inclinations of up to ±15 degrees do not significantly affect the measurement performance.

The above description and drawings are illustrative only because modification could be made without departing from the present invention, the scope of which is to be limited only by the following claims.

What is claimed is:

1. A seat weight measuring apparatus for measuring a seat weight including the weight of a passenger sitting on a vehicle seat, comprising sensor units,
    wherein the sensor units are arranged perpendicular to seat rails to sandwich curved portions of front and rear portions of a seat pan of the vehicle seat;
    wherein lower brackets are attached to inner surfaces of the seat rails of the width direction of the vehicle; and
    wherein each sensor unit is arranged between the upper bracket and the lower bracket.

2. A seat weight measuring apparatus as claimed in claim 1, wherein the sensor units are arranged in spaces at right and left sides of a lower surface of the seat pan.

3. A seat weight measuring apparatus as claimed in claim 1, wherein the sensor units are arranged on inner sides of the seat rails.

4. A seat weight measuring apparatus as claimed in claim 1, wherein a pair of right and left brackets disposed on the inner sides of the seat frame or the seat rails and a reinforcing member for reinforcing the brackets is disposed between the brackets.

5. A seat weight measuring apparatus for measuring a seat weight including the weight of a passenger sitting on a vehicle seat, comprising:
    first and second load sensor units each unit having a load sensor and a transmitting mechanism;
    wherein the first and second load sensor units are arranged perpendicular to left and right seat rails of the seat and are wherein at least one load sensor unit comprises first and second load sensor units that are arranged perpendicular to seat rails of the seat; and are incorporated into the vehicle seat without changing a seat squab height of the vehicle seat;
    upper brackets connecting upper portions of the load sensor units to inner surfaces of left and right upper seat frames; and
    lower brackets connecting lower portions of the sensor units to inner surfaces of the left and right seat rails,
    wherein the first and second load sensor units are incorporated into the vehicle seat without changing a seat squab height of the vehicle seat;
    wherein the first load sensor unit is connected to and measures a load on front-right and front-left portions of the seat and is positioned in an existing space below a front of the seat; and
    wherein the second load sensor unit is connected to and measures a load on back-right and back-left portions of the seat and is positioned in an existing space below a back of the seat.

6. A seat weight measuring apparatus for measuring a seat weight including the weight of a passenger sitting on a vehicle seat, comprising a load sensor unit having a load sensor and a transmitting mechanism;
    wherein the load sensor unit is incorporated into the vehicle seat without changing a seat squab height of the vehicle seat;
    wherein the load sensor unit is arranged at a center of a lower portion of the vehicle seat;
    wherein the transmitting mechanism transmits loads at four locations, front and rear on left and right sides of a lower portion of the vehicle seat, to said load sensor; and
    wherein the transmitting mechanism forms the shape of an X.

7. A seat weight measuring apparatus for measuring a seat weight including the weight of a passenger sitting on a vehicle seat, comprising
    at least one load sensor unit having a load sensor and a transmitting mechanism; wherein the at least one load sensor unit is incorporated into the vehicle seat without changing a seat squab height of the vehicle seat;
    a seat sub-frame subjected to loads at front-left and front-right sides of the vehicle seat,
    wherein the load sensor is arranged at the center of a lower portion of the vehicle seat;
    wherein the transmitting mechanism transmits the load applied to said seat sub-frame and loads applied to back-left and back-right portions of the vehicle seat to the load sensor; and loads at four locations, the load applied to said seat sub-frame and loads applied to back-left and back-right portions of the vehicle seat to the load sensor; and
    wherein the transmitting mechanism forms the shape of a Y.

8. A seat weight measuring apparatus for measuring a seat weight including the weight of a passenger sitting on a vehicle seat, comprising
    at least one load sensor unit having a load sensor and a transmitting mechanism, wherein the at least one load sensor unit is incorporated into the vehicle seat without changing a seat squab height of the vehicle seat;
    a seat sub-frame subjected to loads at front-left and front-right sides of the vehicle seat,
    wherein the load sensor is arranged at the central portion in a width direction of the vehicle seat and at a rear portion of a lower portion of the vehicle seat;
    wherein the transmitting mechanism transmits the load applied to the seat sub-frame and loads applied to back-left and back-right portions of the vehicle seat to the load sensor; and
    wherein the transmitting mechanism forms the shape of a T.

9. A seat weight measuring apparatus for measuring a seat weight including the weight of a passenger sitting on a vehicle seat, comprising
    at least one load sensor unit having a load sensor and a transmitting mechanism wherein the at least one load sensor unit is incorporated into the vehicle seat without changing a seat squab height of the vehicle seat;
    a seat sub-frame subjected to loads at back-left and back-right sides of the vehicle seat,
    wherein the load sensor is arranged at the center of a lower portion of the vehicle seat;
    wherein the transmitting mechanism transmits the load applied to the seat sub-frame and loads applied to front-left and front-right portions of the vehicle seat to the load sensor; and
    wherein the transmitting mechanism transmits the load applied to the seat sub-frame and loads applied to front-left and front-right portions of the vehicle seat to the load sensor; and wherein the transmitting mechanism forms the shape of a Y.

10. A seat weight measuring apparatus for measuring a seat weight including the weight of a passenger sitting on a vehicle seat, comprising
- a load sensor unit having a load sensor and a transmitting mechanism, wherein load sensor unit is incorporated into the vehicle seat without changing a seat squab height of the vehicle seat;
- a seat sub-frame subjected to loads at back-left and back-right sides of the vehicle seat,
- wherein the load sensor is arranged at the central portion in the width direction of a vehicle seat and at a front portion of a lower portion of a vehicle seat;
- wherein the transmitting mechanism transmits the load applied to the seat sub-frame and loads applied to front-left and front-right portions of the vehicle seat to the load sensor; and
- wherein the transmitting mechanism forms the shape of a T.

11. A seat weight measuring apparatus as claimed in claim 3, wherein the load sensor units are positioned to have an inclination relative to a horizontal direction.

12. The seat weight measuring apparatus claimed in claim 2, wherein a pair of right and left brackets disposed on the inner sides of the seat frame or the seat rails and a reinforcing member for reinforcing the brackets is disposed between the brackets.

13. The seat weight measuring apparatus claimed in claim 3, wherein a pair of right and left brackets disposed on the inner sides of the seat frame or the seat rails and a reinforcing member for reinforcing the brackets is disposed between the brackets.

14. A vehicle seat comprising:
- a seat pan;
- an upper seat frame connected to the seat pan and having a portion extending downward toward the floor of the vehicle;
- a lower seat frame connected to a seat rail and having a portion extending upward toward the seat pan; the seat rail being connected to the floor of the vehicle;
- a seat weight measuring apparatus for measuring the weight of the seat including the weight of a passenger sitting on the seat, the apparatus including a plurality of sensor units;
- wherein each sensor unit is connected to the upper and lower seat frames and is positioned to avoid intersection with any plane containing at least one of the extending portions of the seat frames.

15. The seat of claim 14, further comprising an upper seat bracket for connecting at least one of the sensor units to the upper seat frame.

16. The vehicle seat of claim 14, further comprising a lower seat bracket for connecting at least one of the sensor units to the lower seat frame.

* * * * *